United States Patent
Dashora et al.

(10) Patent No.: US 9,185,082 B2
(45) Date of Patent: *Nov. 10, 2015

(54) METHOD AND APPARATUS FOR ADAPTIVE APPLICATION MESSAGE PAYLOAD CONTENT TRANSFORMATION IN A NETWORK INFRASTRUCTURE ELEMENT

(71) Applicant: Cisco Technology, Inc., San Jose, CA (US)

(72) Inventors: Vinod Dashora, Fremont, CA (US); Sandeep Kumar, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,692

(22) Filed: Jan. 18, 2013

(65) Prior Publication Data

US 2013/0132518 A1    May 23, 2013

Related U.S. Application Data

(63) Continuation of application No. 11/398,983, filed on Apr. 5, 2006, now Pat. No. 8,458,467.

(60) Provisional application No. 60/692,715, filed on Jun. 21, 2005.

(51) Int. Cl.
*H04L 29/06* (2006.01)
*G06F 9/445* (2006.01)
(Continued)

(52) U.S. Cl.
CPC .............. *H04L 63/0428* (2013.01); *G06F 8/67* (2013.01); *H04L 29/06* (2013.01); *H04L 41/026* (2013.01);
(Continued)

(58) Field of Classification Search
CPC ... H04L 63/102; H04L 63/12; H04L 63/0245; H04L 63/0428

USPC .......................... 713/151, 152, 167; 726/3, 13
See application file for complete search history.

(56) References Cited

U.S. PATENT DOCUMENTS 5,960,200 A * 9/1999 Eager et al. .................... 717/147
6,167,438 A   12/2000 Yates et al.
(Continued)

FOREIGN PATENT DOCUMENTS

EP        1 011 244 A2    6/2000

OTHER PUBLICATIONS

Brewer, Eric A., et al. "A network architecture for heterogeneous mobile computing." Personal Communications, IEEE 5.5 (1998): 8-24.*

(Continued)

*Primary Examiner* — Kari Schmidt
(74) *Attorney, Agent, or Firm* — Hickman Palermo Becker Bingham LLP

(57) ABSTRACT

Application message payload data elements are transformed within a network infrastructure element such as a packet data router or switch. The network element has application message transformation logic for receiving one or more packets representing an input application message logically associated with OSI network model Layer 5 or above; extracting an application message payload from the input application message; identifying one or more first content elements in the application message payload; transforming the first content elements into one or more second content elements of an output application message; and forwarding the output application message to a destination that is identified in the input application message. Transformations performed in the network element can include field reordering, field enrichment, field filtering, and presentation transformation.

26 Claims, 9 Drawing Sheets

(51) Int. Cl.
*H04L 12/24* (2006.01)
*H04L 12/26* (2006.01)
*H04L 12/701* (2013.01)
*H04L 12/771* (2013.01)
*H04L 29/08* (2006.01)

(52) U.S. Cl.
CPC ........ *H04L 41/5003* (2013.01); *H04L 41/5009* (2013.01); *H04L 41/5012* (2013.01); *H04L 41/5096* (2013.01); *H04L 43/0811* (2013.01); *H04L 45/00* (2013.01); *H04L 45/56* (2013.01); *H04L 45/563* (2013.01); *H04L 63/0245* (2013.01); *H04L 63/08* (2013.01); *H04L 63/102* (2013.01); *H04L 63/12* (2013.01); *H04L 67/02* (2013.01); *H04L 67/34* (2013.01); *H04L 69/22* (2013.01); *G06F 2221/2141* (2013.01); *H04L 41/06* (2013.01); *H04L 41/0893* (2013.01); *H04L 41/12* (2013.01); *H04L 41/22* (2013.01)

(56) References Cited

U.S. PATENT DOCUMENTS

| | | | |
|---|---|---|---|
| 6,389,462 B1 | 5/2002 | Cohen et al. | |
| 6,683,881 B1* | 1/2004 | Mijares et al. | 370/401 |
| 6,718,326 B2 | 4/2004 | Uga et al. | |
| 6,766,361 B1 | 7/2004 | Venigalla | |
| 6,820,133 B1 | 11/2004 | Grove et al. | |
| 6,901,445 B2 | 5/2005 | McCanne et al. | |
| 6,976,085 B1 | 12/2005 | Aviani et al. | |
| 7,058,973 B1* | 6/2006 | Sultan | 726/12 |
| 7,080,158 B1 | 7/2006 | Squire | |
| 7,127,492 B1 | 10/2006 | Calo | |
| 7,185,063 B1 | 2/2007 | Kasriel et al. | |
| 7,188,216 B1 | 3/2007 | Rajkumar et al. | |
| 7,362,763 B2 | 4/2008 | Wybenga et al. | |
| 7,376,750 B1* | 5/2008 | Simu | 709/245 |
| 7,451,392 B1* | 11/2008 | Chalecki et al. | 715/234 |
| 7,590,704 B2 | 9/2009 | Yuan et al. | |
| 7,987,271 B1 | 7/2011 | O'Toole, Jr. et al. | |
| 8,255,932 B1* | 8/2012 | Clemm et al. | 719/329 |
| 2002/0059428 A1 | 5/2002 | Susai et al. | |
| 2003/0069975 A1* | 4/2003 | Abjanic et al. | 709/227 |
| 2004/0032881 A1 | 2/2004 | Arai | |
| 2004/0064586 A1 | 4/2004 | Weigand | |
| 2004/0167986 A1* | 8/2004 | Gilfix et al. | 709/230 |
| 2004/0177160 A1* | 9/2004 | Seto et al. | 709/246 |
| 2004/0205136 A1* | 10/2004 | Whittenberger et al. | 709/206 |
| 2005/0015619 A1* | 1/2005 | Lee | 713/201 |
| 2005/0050021 A1* | 3/2005 | Timmons | 707/3 |
| 2005/0076332 A1* | 4/2005 | Jawaharlal et al. | 717/140 |
| 2006/0064467 A1 | 3/2006 | Libby | |
| 2006/0074981 A1* | 4/2006 | Mauceri et al. | 707/104.1 |
| 2006/0149840 A1* | 7/2006 | Thompson et al. | 709/224 |
| 2006/0167975 A1 | 7/2006 | Chan et al. | |
| 2013/0132518 A1 | 5/2013 | Dashora | |
| 2014/0032690 A1 | 1/2014 | Ramarao | |

OTHER PUBLICATIONS

Snoeren, Alex C., et al. "Single-packet IP traceback." IEEE/ACM Transactions on Networking (ToN) 10.6 (2002): 721-734.*
Intellectuall Property India, First Examination Report in application No. 3155/DELNP/2007, dated Apr. 25, 2013, 1 page.
Current Claims in application No. 3155/DELNP/2007, dated Apr. 2013, 10 pages.
State Intellectual Property Office of the People's Republic of China, "The Third Office Action" in application No. 200580041997.4 dated Apr. 19, 2013, 7 pages.
Current Claims in application No. 200580041997.4, dated Apr. 2013, 7 pages.
China Patent Office, CN 4th Office Action received in International Application No. 200580041996.X dated Jun. 26, 2012 (8 pages).
Current Claims, Application No. 200580041996.X, dated Jun. 2012 (5 pages).
State Intellectual Property Office of the People's Republic of China, "The Fifth Office Action" in application No. 200580041996, dated Oct. 8, 2012, 8 pages.
Current Claims in application No. 200580041996, dated Oct. 2012, 5 pages.
European Patent Office, "Search Report" in application No. 05852737.5-1853, dated Aug. 21, 2013, 6 pages.
Current Claims in application No. 05852737.5-1853, dated Aug. 2013, 5 pages.
European Patent Office, "Search Report", in application No. 05 820 894.3-1954, dated Oct. 7, 2013, 7 pages.
Current Claims in application No. 05 820 894.3-1954, dated Oct. 2013, 5 pages.
Roesch, M., "Snort—Lightweight Intrusion Detection for Networks", Proceedings of the Systems Administration Conference, dated Nov. 7, 1999, 11 pages.
European Patent Office, "Search Report" in application No. 05854364.6-1870, dated Nov. 25, 2014, 7 pages.
Claims in European Application No. 05854364.6-1870, dated Nov. 2014, 4 pages.
European Patent Office, "Search Report" in application No. 05 854 364.6-1870, dated May 6, 2105, 4 pages.
Claims in European Application No. 05 854 364.6-1870, dated May 2015, 4 pages.
International Searching Authority, "Search Report" in application No. PCT/US2015/024930, Dated Jul. 21, 2015, 12 pages.
Claims in application No. PCT/US2015/024930, Dated Jul. 2015, 6 pages.

* cited by examiner

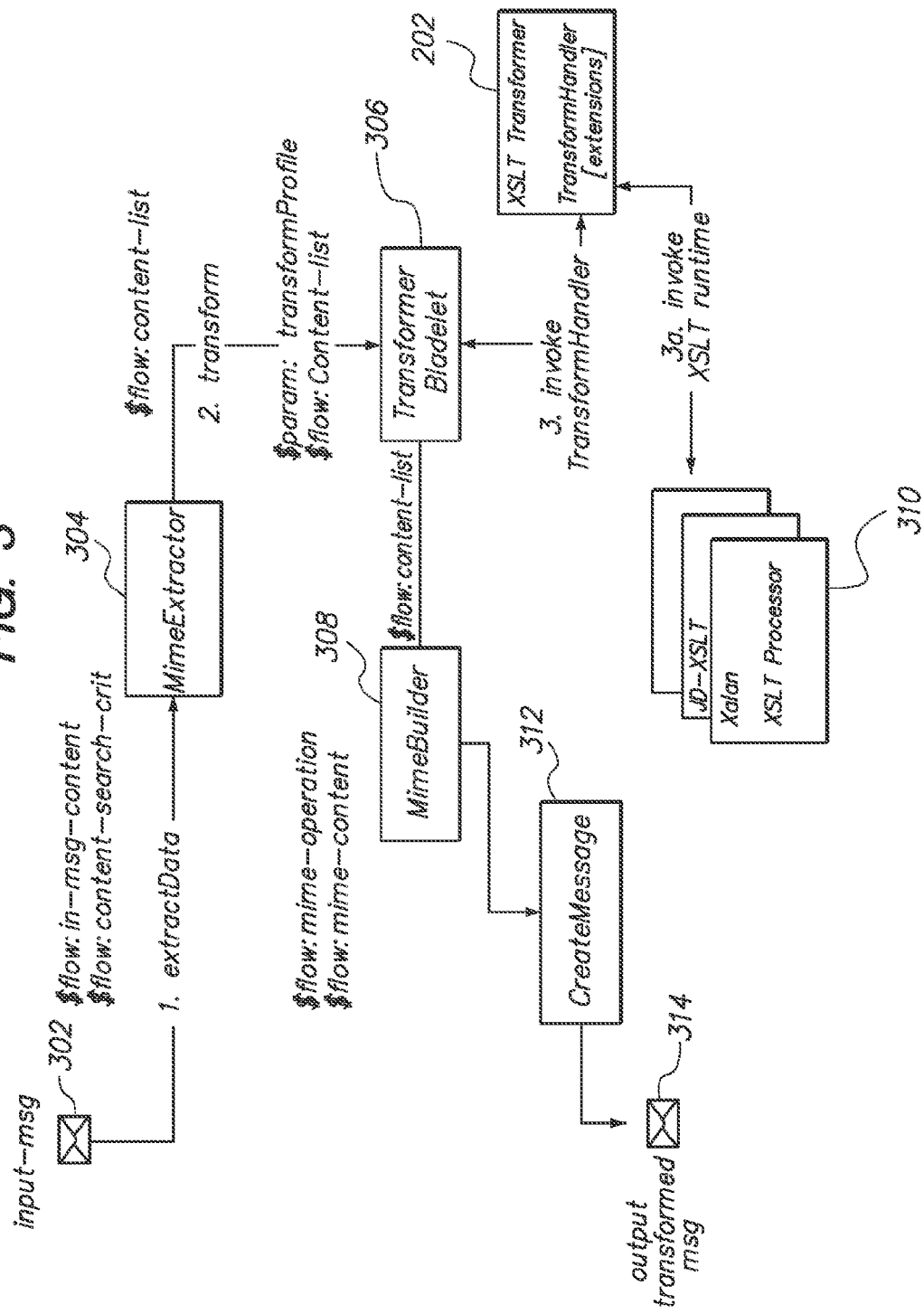

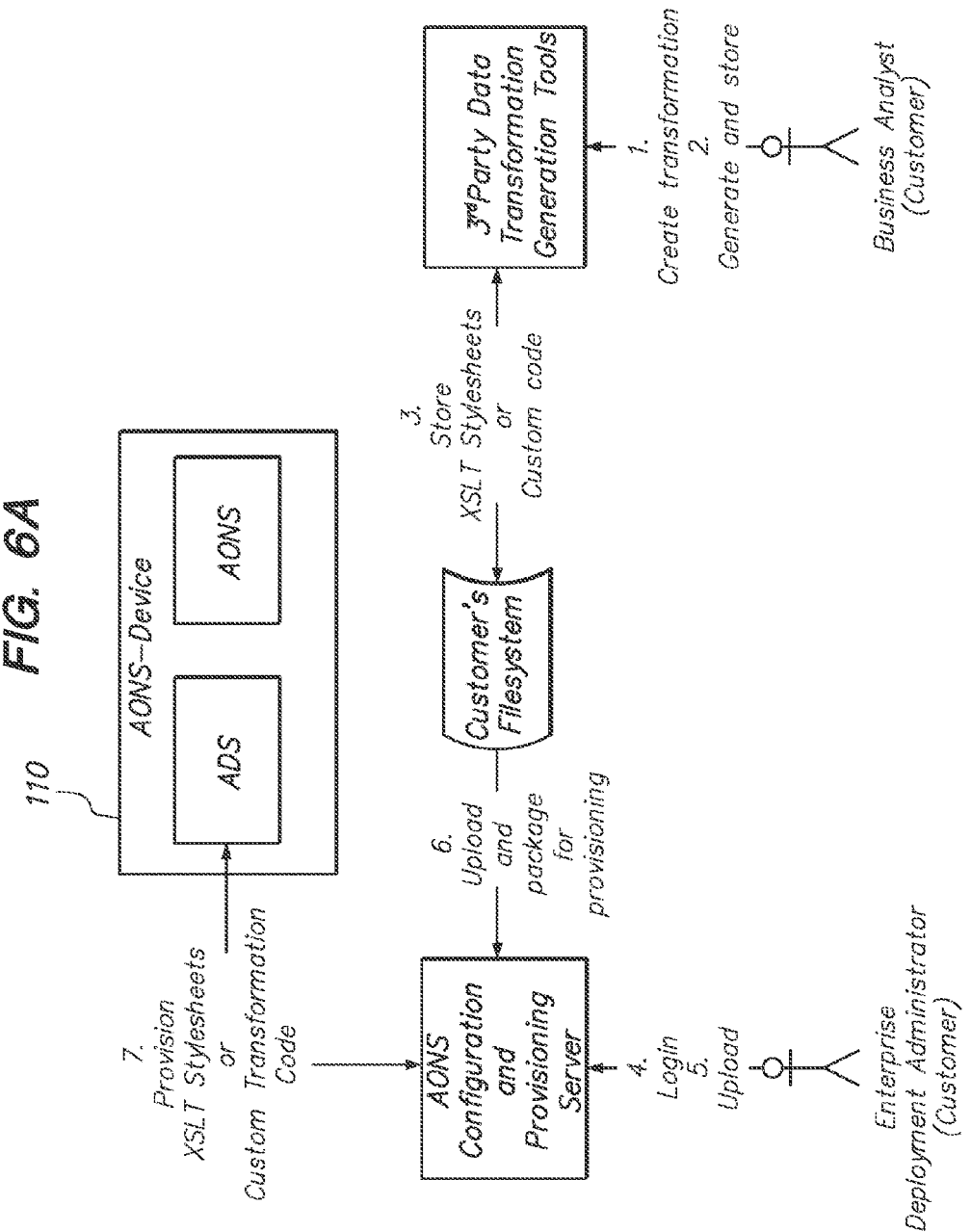

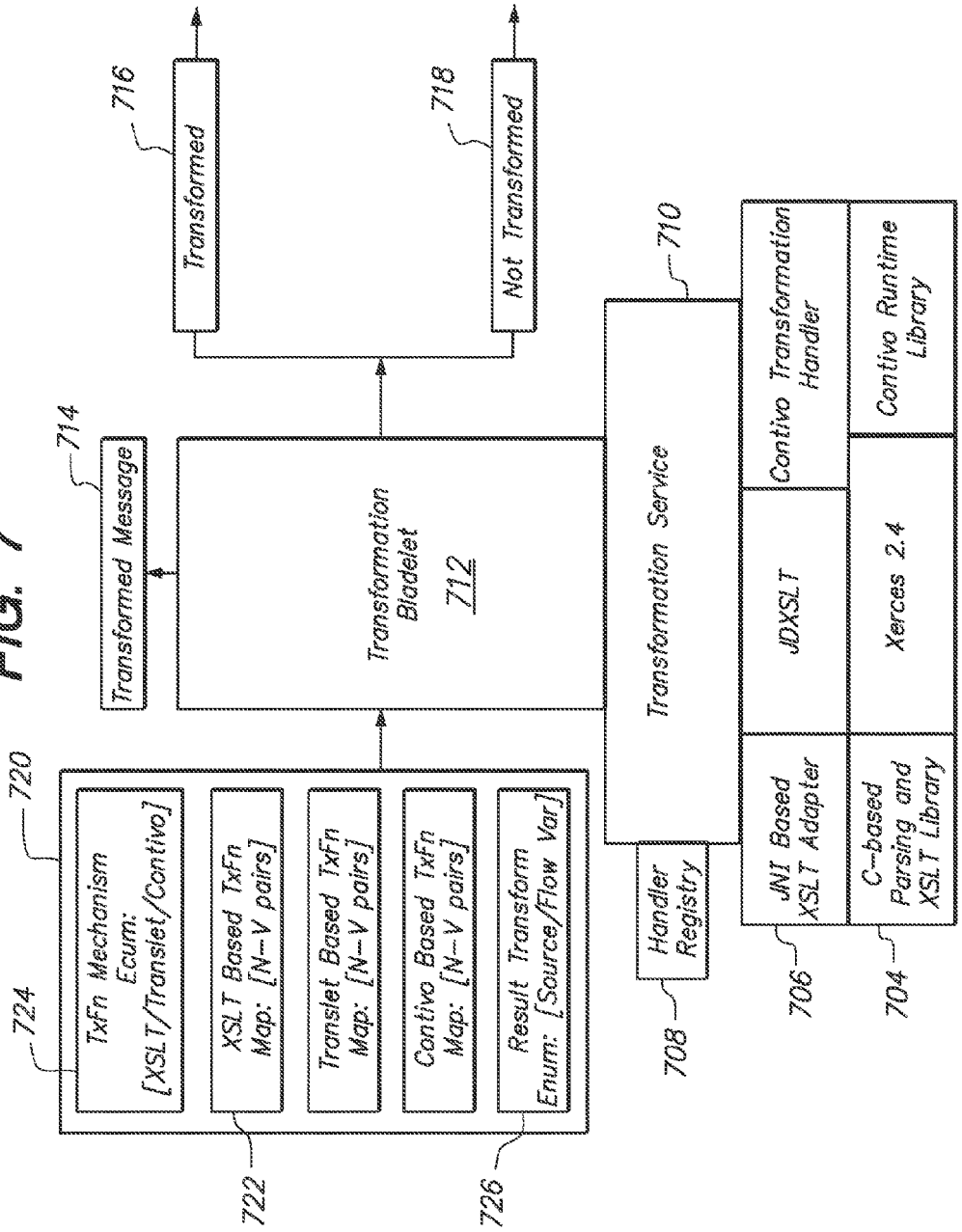

METHOD AND APPARATUS FOR ADAPTIVE APPLICATION MESSAGE PAYLOAD CONTENT TRANSFORMATION IN A NETWORK INFRASTRUCTURE ELEMENT

PRIORITY CLAIM

Cross-Reference to Related Applications

This application claims the benefit as a Continuation of application Ser. No. 11/398,983, filed Apr. 5, 2006, which claims the benefit under 35 U.S.C. §119(e) of provisional application 60/692,715, filed Jun. 21, 2005, the entire contents of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s). This application is generally related to prior application Ser. No. 10/991,792, filed Nov. 17, 2004.

FIELD OF THE INVENTION

The present invention generally relates to data processing techniques performed within network infrastructure elements such as routers and switches. The invention relates more specifically to techniques for transforming network message payloads into different internal formats.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Software applications operating in a network environment produce or consume application messages. For example, a client software element hosted at an end station device such as a personal computer or workstation may form and send a message to a corresponding application server that is hosted in a network. Each message typically comprises one or more headers and a payload that contains application-specific information. Messages may be contained in more than one data frame, packet, segment, or other unit of organization under a network communication protocol. In the description herein, a "message" is a set of data relating to an application and associated with Layer 5, 6 or 7 of the OSI network reference model.

Such application-layer messages often need to be changed or transformed so that applications consuming the messages can handle them. These messages can arrive at a network device over different lower-layer protocols, such as HTTP, HTTPS, JMS, MQ, RV, and certain proprietary protocols that use TCP or UDP as a transport. Typically, a receiving application must receive a message in a particular format that the application understands. As a result, some intermediary processing unit must transform an inbound message to the required format for the application.

Generally, in past approaches such transformations have been performed using applications or mechanisms that are running on a host associated with an application endpoint. For example, an application server may include transformation logic. But as applications and their message formats evolve, each sending and receiving application is required to accommodate an increasing number of different application-layer message formats. The transformation logic at each application server requires modification to accommodate new formats. This is time-consuming and requires significant resources in programming labor. There is a need for an improved approach for performing application-layer transformation that does not require re-coding or modifying application servers, clients, or other end stations.

Further, in typical past approaches, application message transformation is performed either by an application consuming the message, or by a process or mechanisms running on a host on behalf of the application consuming the message. Alternatively, message transformation is performed by the application producing the message, based on the target application endpoint.

In all these cases, the number of points at which transformation is performed increases based on the number of application endpoints producing or consuming the message. For example, if seven instances of a database application were hosted in a particular server, then in the conventional approach, all seven instances would have to perform message payload transformation. This is a waste of application processing resources. There is a need for a more efficient approach that can somehow consolidate, at a single processing point, all message payload transformation work for a plurality of instances of an application or for multiple different applications.

One approach for performing message transformation is described in prior application Ser. No. 10/991,792, filed Nov. 17, 2004, of Pravin Singhal et al. ("Singhal et al."), and assigned to the assignee hereof. The approach of Singhal et al. provides mechanisms for transport protocol message brokering. For example, the approach of Singhal et al. can receive a message that uses the HTTP protocol and change that message into an MQ message. However, the approach of Singhal et al. does not change, modify or transform data contained within a payload portion of the inbound message. Thus, if an inbound HTTP message contains an XML document as a payload, but a receiving application requires a particular kind of FIX or COBOL CopyBook message payload as input, the approach of Singhal does not provide a solution. In contrast, Singhal et al. would be able to change the inbound HTTP message into an IBM MQ message carrying the same XML document as a payload.

Further, if the inbound message has an XML payload containing a "date" data field that is expressed in "MMDDYY" format, but the receiving application requires all dates to be expressed in "YYYYMMDD" format, the approach of Singhal does not provide a solution.

Thus, based on the clear deficiencies of past approaches, there is a need for an approach that can perform message payload transformation independent of the application transport protocols that carry such payloads.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a data flow diagram that shows transformation of an application message payload, in one embodiment;

FIG. 6A is a block diagram showing steps involved in one embodiment of creating and deploying transformations in a network infrastructure element;

FIG. 7 is a block diagram of a software stack that may be used to implement one embodiment of application message payload transformation in a network infrastructure element.

DETAILED DESCRIPTION

Figure 1A:
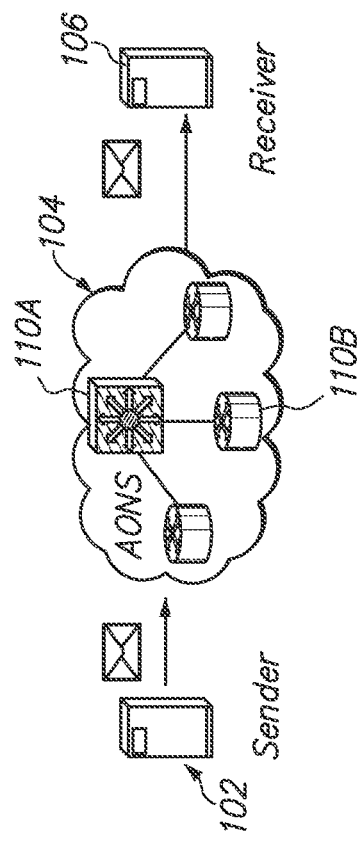
FIG. 1A is a block diagram that illustrates an overview of a network arrangement that can be used to implement an embodiment.

A method and apparatus for application message payload transformation in a network infrastructure element are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
 1.0 General Overview
 2.0 Structural and Functional Overview
 3.0 Application Message Payload Transformation Approaches
  3.1 xSLT-Based Transformation
  3.2 Message Flow within a Network Element
  3.3 Transformation Design Example
   3.3.1 Transformation Bladelet and Parameters
   3.3.2 Transformation Policy Configuration
   3.3.3 Transformation Parser Policy Configuration
   3.3.4 Class Implementation
   3.3.5 Creating and Deploying Transformations
 4.0 Implementation Mechanisms—Hardware Overview
 5.0 Extensions and Alternatives
 1.0 General Overview The needs identified in the foregoing Background, and other needs and objects that will become apparent for the following description, are achieved in the present invention, which comprises, in one aspect, a data processing apparatus comprising a plurality of network interfaces that are coupled to a data network for receiving one or more packets therefrom and sending one or more packets thereto; one or more processors; a switching system coupled to the one or more processors and packet forwarding logic, wherein the switching system and packet forwarding logic are configured to receive packets on a first network interface, determine a second network interface on which to send the packets, and to send the packets on the second network interface; and application message transformation logic comprising one or more stored sequences of instructions which, when executed by the one or more processors, cause the one or more processors to perform: receiving one or more packets representing an input application message logically associated with OSI network model Layer 5 or above; extracting an application message payload from the input application message; identifying one or more first content elements in the application message payload; transforming the first content elements into one or more second content elements of an output application message; and forwarding the output application message to a destination that is identified in the input application message.

In one feature of this aspect, the apparatus further comprises sequences of instructions which, when executed by the processor, cause the processor to perform transforming the first content elements into one or more second content elements of an output application message by any of field reordering, field enrichment, field filtering, and presentation transformation.

In another feature, the apparatus further comprises sequences of instructions which, when executed by the processor, cause the processor to perform transforming the first content elements into one or more second content elements of an output application message by any one of: structural reordering; complex map, schema, and dictionary-based transformation; content formatting at the presentation layer, such as XML to HTML and WML transformation, or transformation based on required media types of the receiver; personalization; security credential mapping; content aggregation; content splitting; service interface virtualization; performing content-based lookup, extraction, routing and distribution; content validation; data validation; and code page translation.

In a further feature, the application message payload transformation logic comprises a transformer bladelet that uses a transformation service, and a transformer factory that creates a transformer function that is registered in the transformation service. In another feature, the transformer function is coupled to an extensible XSLT transformer that comprises an XSLT processor and an XML reader. In yet another feature, the transformer function comprises a translet-based transformation function, and wherein the transformer function is coupled to an XSLTC compiler, and wherein the transformer function comprises logic configured to invoke the XSLTC compiler to compile an XSL transform file into one or more translets.

In still another feature, the apparatus comprises any of a packet data router and a packet data switch in a packet-switched network. In yet another feature, a transformation policy is received, and specifies what transformation operations to perform on the application message payload, which translator to use, and a content type of the output message, and the transforming step is performed based on the transformation policy.

In other aspects, the invention encompasses a machine-implemented method and a computer-readable medium configured to carry out the foregoing steps.

2.0 Structural and Functional Overview

Figure 1B:
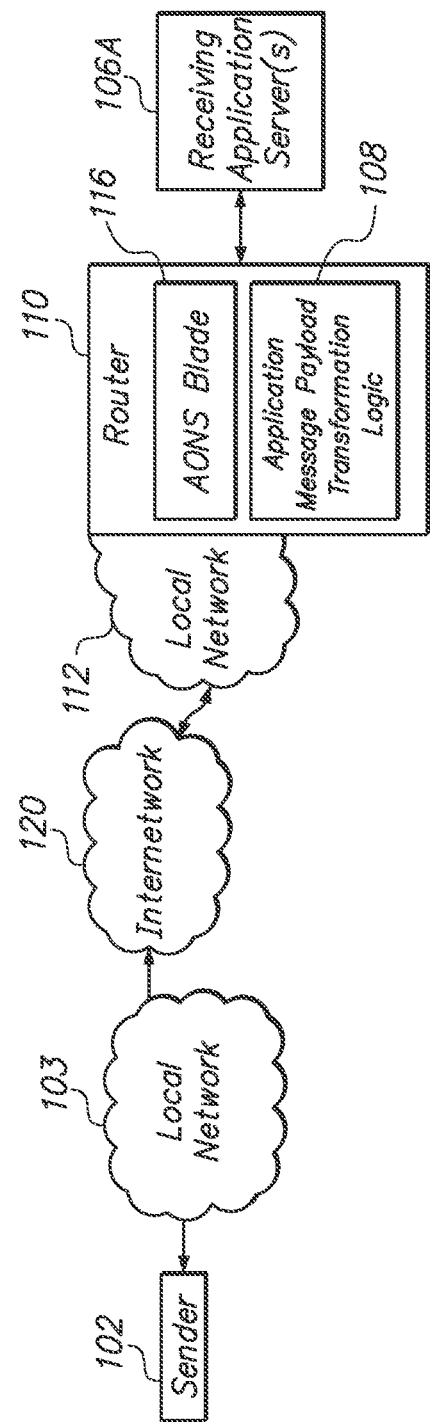
FIG. 1B is a block diagram showing application message payload transformation logic in a network infrastructure element such as a router, in one embodiment.

FIG. 1A is a block diagram of network elements involved in an application message payload transformation approach according to an embodiment. FIG. 1B is a block diagram showing application message payload transformation logic in a network infrastructure element such as a router, in one embodiment.

Referring first to FIG. 1A, a sender application 102 is coupled through a network 104 to a receiver application 106.

The network 104 comprises one or more network infrastructure elements 110, such as routers or switches. Each of the network elements 110 comprises one or more blades, bladelets, scriptlets, or other software elements, alone or in combination with hardware or firmware elements, that implement application-layer message inspection and related application message payload transformation functions as described herein. An "application message," as used herein, refers to a message emitted or consumed by a software element that is logically located at Layer 5 or higher of the OSI reference model.

A commercial embodiment of network elements 110A may comprise routers or switches from Cisco Systems, Inc., San Jose, Calif., with blades having Application-Oriented Networking Services (AONS) capabilities. In some embodiments, network elements 110A are termed "AONS nodes" or "AONS endpoints." Other network elements 110B may be non-AONS nodes. Further, network elements 110A need not use Cisco AONS technology; the network elements can comprise routers or switches that use other internal elements for performing message inspection, processing or transformation within the network elements. Thus, the use of AONS in an embodiment is not required, and all references herein to AONS elements are provided merely to illustrate a clear example, and not as limitations.

As seen in FIG. 1B, in some embodiments sender 102 is coupled through a local network 103 to an internetwork 120 that is coupled to a second local network 112. Either network 103, 112 may have network elements 110 that implement the techniques herein. As an example, in FIG. 1B local network 112 hosts router 110, comprising AONS blade 116 and application message payload transformation logic 108. In certain embodiments all the network elements 110 include application message payload transformation logic 108, which comprises one or more computer programs, programmatic objects, or other software elements that implement the functions described herein.

AONS endpoints may use different formats for the messages that they produce or consume. For example, a message produced by an endpoint may conform to a format that may be different from the format expected by an endpoint that consumes the message. Further an endpoint may produce or consume XML or non-XML messages or use a different structure for message content. In the example of FIG. 1, the sender of a message may specify certain customer information in a detailed form, whereas the receiver of the message only expects abbreviated customer information.

In other examples, transformation of an application message payload may be needed for the sender 102 and receiver 106 to communicate and process requests and responses. Example message payload transformations include field reordering, field enrichment, field filtering, and presentation transformation.

In Field Reordering, sender 102 sends a message that contains fields in a certain order that is different from an order that receiver 106 requires. For example, sender 102 sends a message with the fields of Table 1A below, but receiver 106 requires fields in the order of Table 1B:

TABLE 1A

SENDER FIELD ORDER

<shipping-address>
<first-name>John</first-name>
<last-name>Doe</last-name>
<...>
</shipping-address>

TABLE 1B

RECEIVER FIELD ORDER

<shipping-address>
<last-name>Doe</last-name>
<first-name>John</first-name>
<...>
</shipping-address>

In Field Enrichment and Field Filtering, sender 102 sends some information that receiver 106 does not expect. Thus, the information needs to be filtered so that receiver 106 can correctly process the message. For example, sender 102 may include a <middle-name> field in data representing a person in a shipping address, but the receiver 106 may not expect that field. In response, in the approach herein an application message payload transformation process removes the unexpected field before delivering the message to the receiver 106. Alternatively, if receiver 106 does expect a middle name field but sender 102 sends a message that does not have that field, then the application message payload transformation logic 108 inserts an empty middle-name field.

In Presentation Transformation, a message payload is transformed to conform to a specific presentation format that the receiver 106 expects. For example, assume that receiver 106 sends a response carrying an XML payload, but sender 102 needs to display the response on a browser associated with the sender. The application message payload transformation logic 108 transforms the XML data into an HTML document and places the HTML document into the message payload before forwarding the message to the sender 102. As a result, sender 102 can display the content of the payload. Alternatively, if the receiver 106 is using a device that requires content in a message payload to be displayed be in WML, then the application message payload transformation logic 108 converts the message payload to WML so that the receiver can correctly display the content.

As another example, the application message payload transformation logic 108 can transform a non-XML message payload to a corresponding XML format. For example, assume that a message payload that is in CSV format needs to be presented to receiver 106 in an XML format. Alternatively, assume that sender 102 sends a FIX message, but receiver 106 expects the message to be in FIXML format. In both cases, the application message payload transformation logic 108 transforms the payload from FIX format to FIXML format and forwards the message to the receiver 106.

Generally, in all the preceding cases, the application message payload transformation logic 108 performs a transformation function on an in-coming message and produces an outgoing message. In an embodiment, local network 112 is associated with one or more receiving application servers 106A, which host one or more instances of one or more applications. Thus, in the arrangement of FIG. 1B, router 110 is proximate to the receiving application servers 106A, and can perform application message payload transformation for all the application servers. For example, sender 102, and other senders at different locations in networks 103, 120, might send different requests to different instances of applications on different application servers 106A. The application message payload transformation logic 108 can perform application message payload transformation for all such requests, relieving the application instances and application servers 106A from the processing burden of performing application message payload transformation for each request.

Alternatively, if router 110 is located in local network 103, the router can perform application message payload transformation when sender 102 emits messages and before the messages reach the application servers 106A. In all such cases, the data processing efficiency of the application servers 106A is greatly improved because router 110 is responsible for message transformation, and the application servers are responsible only for performing substantive application functions.

Thus, according to one embodiment, message payload transformation is performed in a network device based on the requirements of a consuming application. In this approach, a message is transformed outside the application producing or consuming such message. In a specific embodiment, message payload transformation is performed in a network infrastructure element, such as a router or a switch in a packet-switched network.

When message payload transformation is performed in a network device, the transformation can be performed on a device that is closer to the application that is producing the message or the application that is consuming the message. As a result, if there are multiple instances of an application running, possibly on different hosts, then a single device through which all the messages are passing can perform the needed transformation. Accordingly, efficiency of the overall network is improved.

In an embodiment, message payload transformation is specified by declarative policies based on the source and target endpoints of the application and contents of the message. A policy can define a "custom" message payload transformation in terms of particular message attributes, variables or values. A policy defines what part of a message is operated upon, how to transform the message, and the form of the output. The policies can be deployed on a network device at which the message payload transformation is performed.

In this approach, applications do not need to change based on changes in the kind of message that the applications consume. Further, when message payload transformation is performed on a network device, the transformation can be performed at fewer locations in the network, thus reducing application processing resources.

In one embodiment, XSLT-based Transformation Engines perform XML and non-XML message transformation. The XSLT-based Transformation Engines implement the XSLT 1.x and XSLT 2.0 specifications as defined by the W3C consortium (w3c.org). At the time of this writing, XSLT specifications are available online in the folder /TR/xslt of the domain "w3c.org" on the World Wide Web. In one embodiment, the application message payload transformation logic 108 is extensible in its use of XSLT processor. Thus, the application message payload transformation logic 108 is structured to allow the use of a different XSLT processor if required.

In an embodiment, the application message payload transformation logic 108 is extensible. The application message payload transformation logic 108 can be augmented by integrating a third party application that provides a specialized transformation function. For example, a scriptlet can be used to build a transformation component that uses a third-party tool or application. The application message payload transformation logic 108 performs transformations only on message payloads, and is not involved in the transport mechanism that is used to move the message among network elements.

Extensions to the application message payload transformation logic 108 can be implemented by providing a Parser Plugin and Custom Transformer extension. In an embodiment, the Parser Plugin and Custom Transformer extension are JAVA language object implementations, and are developed using the JAVA development environment. For example, creating a Parser Plugin Package in JAVA can be performed to extend the application message payload transformation logic 108.

In one embodiment, Transform and Transform Parser bundles, Transformation Policies, Transformation Flows are created and deployed to network elements 106. After such deployment, network elements 106 can receive and transform messages. In an embodiment, application message payload transformation logic 108 performs one or more message payload transformations include any of field reordering, field enrichment, field filtering, and presentation transformation. Such transformations may include structural reordering; complex map, schema, and dictionary-based transformation; content formatting at the presentation layer, such as XML to HTML and WML transformation, or transformation based on required media types of the receiver; personalization; security credential mapping; and other transformations.

Transformations also may include content aggregation and splitting. For example, multiple MIME parts in a message can be aggregated or split. In a SOAP message, the headers can be split from the body and each piece can be used in different ways. The aggregation, splitting, enrichment, filtering, and mapping techniques described herein can be implemented to provide interoperability of application messages across different standards. Further, content encoding can be performed. Service interface virtualization techniques can be achieved by using transformations to carry out interface splitting and interface versioning.

Further, application message payload transformation logic 108 may be configured to parse message content and then perform content-based lookup, extraction, routing and distribution. For example, a transformation can specify extracting particular content from an application message payload, placing the content in a new message, and distributing the new message to another node, such as a monitoring node.

Additionally or alternatively, application message payload transformation logic 108 may be configured to perform content validation and data validation based on data structure and data type, for either a source message or destination message. In this embodiment, application message payload transformation logic 108 examines payload field values and determines, based on a transformation schema, whether the field values are valid in terms of structure and content. If field values are not valid, then the transformation schema specifies how to transform the values into valid values. Thus, semantic message content transformation for an application payload can be performed.

Additionally or alternatively, application message payload transformation logic 108 may be configured to perform code page translation. In code page translation, normalized content as maintained by a service (e.g., Unicode character encoded content) is mapped to a locale-specific content encoding. Elements representing times, dates, calendar entries, etc., can be transformed into an encoding or format that a receiving application requires. Alternatively, a request message that conforms to a locally required content encoding may be transformed into a normalized content encoding and then sent to a service.

Embodiments allow adaptation and extension of the mechanisms that perform application message payload transformation. For example, an administrator or other user can add new or different XSLT Transforms, Parser Plugin Transforms, or Custom Transforms to accomplish particular desired forms of application message payload transformation. Thus, the user can build upon existing transform logic that is available, using transforms that have been uploaded by the same user or other user. Therefore, a user can dynamically apply transform logic without bringing down the host device to install new software.

Further, "chain" transformation processing is supported in which a network element may apply transform logic successively on an application message payload. Thus, more than one transform may be applied successively to a content payload that is retrieved from an incoming message before the payload is transformed into result content in an outgoing message. In an embodiment, an overall transform step comprises one or more transform steps, implemented in one or more transform bladelets in a workflow that successively transforms the content.

Embodiments are implemented in network elements such as routers and switches. As a result, embodiments implement the notion of sandboxing, in which message transformation is performed within a network element before messages reach applications. This approach provides isolation of the transformation functions and allows a single network element to transform all messages destined to multiple instances of an application.

3.0 Application Message Payload Transformation Approaches

This section describes functions performed to accomplish application message payload transformation for an incoming message represented in an XML format.

3.1 XSLT-Based Transformation

In one embodiment, XSL Transform ("XSLT") based transformation is performed. In this approach, an XSLT specifies how an input message is transformed to produce an output message.

The XSLT is created in advance of message processing, based on known schema of input messages and output messages. The XSLT can be created using any existing XSLT design tool. During runtime, an XSLT processor in the application message payload transformation logic 108 receives the XSLT and an input message. The XSLT processor applies the transform to the message and produces an output message. The application message payload transformation logic 108 then directs other functional elements of the network element 106 to forward the message to its destination.

Figure 2A:
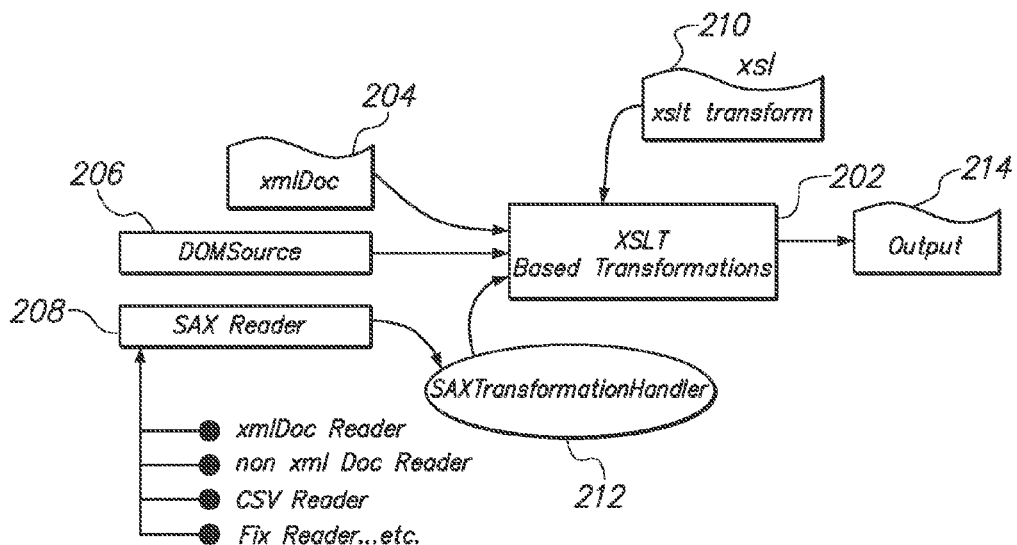
FIG. 2A is a block diagram of software elements that may be used to implement XSLT-based application message payload transformation, in one embodiment.

The XSLT can produce an output message having an XML payload or a non-XML payload. FIG. 2A is a block diagram showing functional elements that may be used in application message payload transformation logic 108 to perform application message payload transformation either for an XML payload or a non-XML payload. When an inbound message comprises an XML payload 204, the XML payload is received at XSLT translator 202. The translator 202 applies a previously created XSLT transform 210 to the message, resulting in generating an output message 214.

In another embodiment, when a non-XML input message is used, during design time an extension to the AON Message Parser component is made and registered with AON so that a non-XML input message can be parsed to produce a corresponding DOM Source 206, or emit SAX events that a SAX reader 208 reads, for an equivalent XML input message. The DOM Source 206, or output of the SAX reader 208 after processing by a SAX transformation handler 212, provides the XSLT translator 202 with input equivalent to an XML input message. The translator 202 applies a previously created XSLT transform 210 to the message, resulting in generating an output message 214.

Thus, the xmlDoc reader, non-XML Doc Reader, CSV Reader, and FIX Reader referenced in FIG. 2A represent extensibility mechanisms for the application message payload transformation logic 108.

In one embodiment, translator 202 comprises the XALAN processor, which is supplied with the JAVA Development Kit from Sun Microsystems, Inc. Alternatively, the JD-XSLT processor may be used.

Figure 2B:
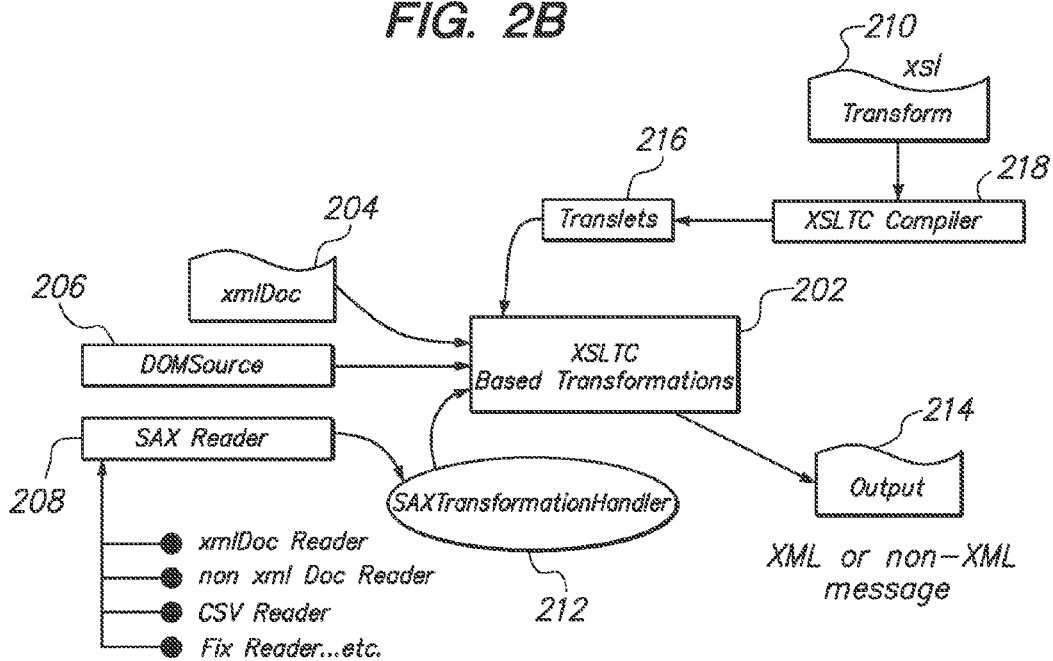
FIG. 2B is a block diagram of software elements that may be used to implement XSLTC-based application message payload transformation, in one embodiment.

FIG. 2B is a block diagram of an embodiment that uses compiled XSLT (XSLTC) based transformation. The elements of FIG. 2B function in a manner that is similar to the XSLT-based transformation approach of FIG. 2A. However, the elements of FIG. 2B provide performance advantages over the approach of FIG. 2A. For example, in FIG. 2B, XSL transforms are compiled into to Translets 216. Each Translet 216 is a JAVA class that is generated as a result of compiling a specified XSLT transform using XSLTC compiler 218. An XSLTC compiler and associated framework for use as XSLTC translator 202 is available in the Apache open source project, and is specifically available at the time of this writing linked in the folder /xalan-j/xsltc/ of the domain "xml.apache.org" on the Internet. Alternatively, an XSLTC framework is commercially available under the trade name Gregor from Ambrosoft.

The binary Translets files 216 are used to transform an incoming message to an outgoing message. Once XSL transforms are compiled, Translet classes are created and can be packaged in a JAR file and made available to the XSLTC translator 202. During runtime, the XSLTC translator 202 uses the Translets to apply a transformation to an incoming message.

3.2 Message Flow within a Network Element

In one embodiment that is implemented using Cisco AONS, transformation of data present in a message is accomplished by designing a flow comprising of three tasks: data extraction, transformation and composition. Each of the tasks is implemented using an AONS Bladelet. An input message is processed through various components before data present in the message is transformed and put in the outbound message, as now described.

FIG. 3 is a data flow diagram that describes a transformation data flow in which data from a message is transformed and provided in an outbound message. In step 1, message content to be transformed is extracted from the input (request or response) message 302 and provided as an input "msgcontent" element to MIMEExtractor bladelet 304. The MIMEExtractor Bladelet also receives additional content search criteria and extracts MIME contents from the message exports it in a content list flow variable.

In step 2, a Transformer Bladelet 306 receives a list of content to transform and a transform profile name. Based on the transform profile, the Transform Bladelet 306 transforms contents from the input content list by invoking a transform handler (step 3) of the XSLT transformer 202. The invocation of step 3 causes the XSLT transformer 202 to invoke a runtime element of XSLT processor 310, at step 3a.

The Transform Bladelet 306 receives an additional parameter (not shown) to decide if the contents in the input content list should be replaced by the transformed contents. If not, the Transform Bladelet 306 places the transformed contents in an output content list flow variable, which is passed to MIMEBuilder 308, which takes the transformed contents from the flow variable content list and takes a MIME Content object. The MIMEBuilder element attaches the transformed content and creates an output MIME content object.

A CreateMessage Bladelet 312 takes the MIME content object that has the transformed content, creates an output message 314, and sends the output message to the indicated destination using the parameters from the inbound message 302. In an embodiment, all steps of FIG. 3 are executed in software elements that are hosted in a network infrastructure element, such as a router or switch. In an embodiment, application message payload transformation logic 108 (FIG. 1A, FIG. 1B) implements the elements and functions of FIG. 3.

In one embodiment, the transformation algorithms and logic described herein are implemented in a Transformation Bladelet and Transformation Service, which are described further herein. In general, the Transformation Bladelet receives an input content list and applies a transformation to result in creating an outgoing transformed content list. The Transformation Bladelet also receives an overwrite option, which specifies whether the contents in the input content list should be replaced by the corresponding result content. The Transformation Bladelet also receives two profile parameters; a first profile parameter specifies a style sheet to use, and the second profile parameter specifies a specific parser plug-in to use.

Figure 4:
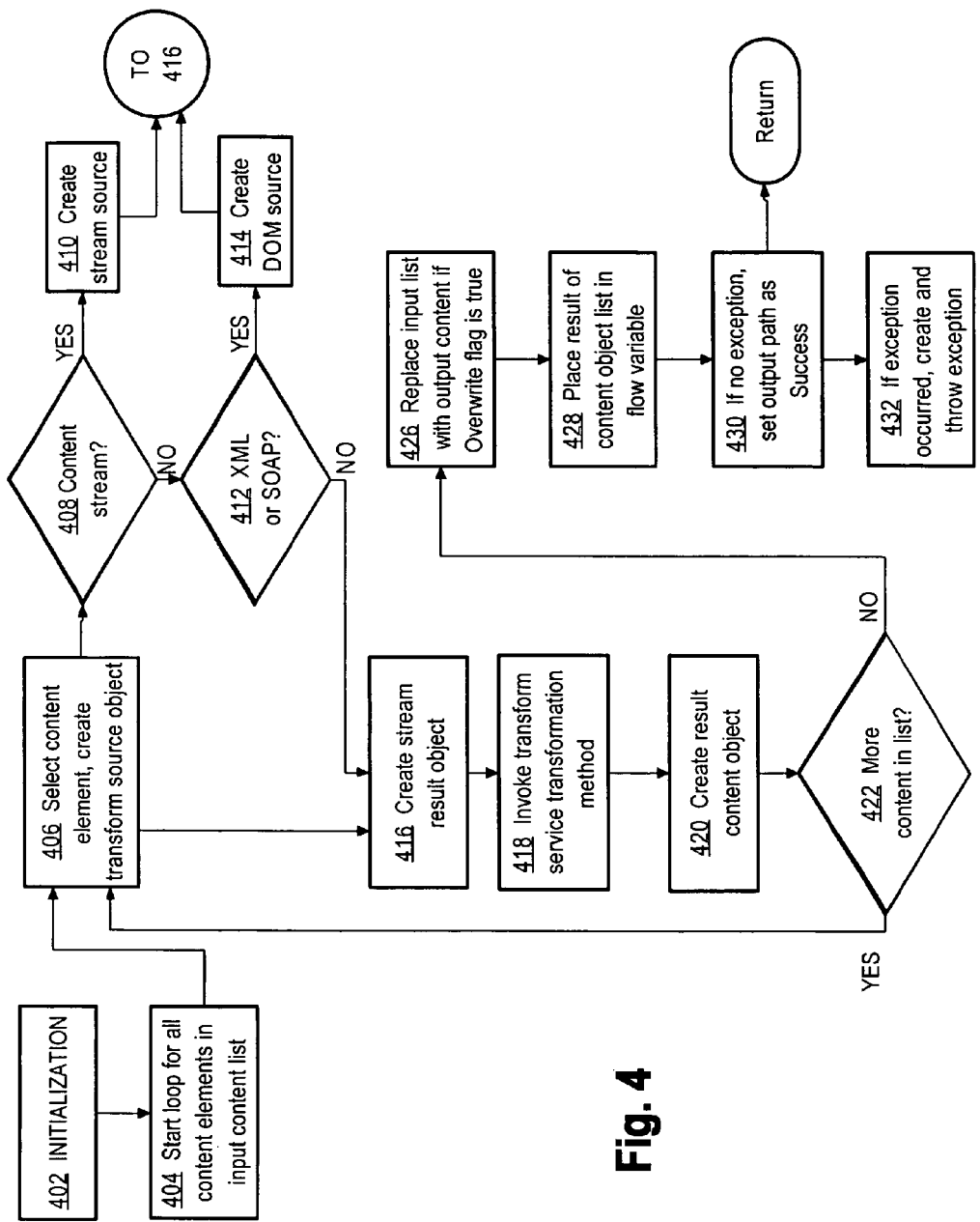
FIG. 4 is a flow diagram that illustrates a high level overview of one embodiment of a method for application message payload transformation in a network infrastructure element.

FIG. 4 is a flow diagram of one embodiment of a process of application message payload transformation. In step 402, Initialization is performed. In one embodiment, initialization comprises reading the Bladelet parameters, including an inputContentList, overwriteOption, stylesheetProfile and parserPluginProfile. Initialization also includes retrieving a Transform Service Implementation object.

As indicated at step 404, for each content element in the input content list, the following steps are performed. In step 406, a content element is selected from the list, and a transform Source object (in Src) is created. In one embodiment, step 406 comprises determining whether a content stream is available (step 408), and if so, creating a stream source (step 410). Applications sometimes use content streams as a means for reducing the memory requirements for storing message payloads. Otherwise, as tested at step 412, if the content element comprises XML or SOAP content, then a DOM Source is created at step 414.

In step 416, a Stream Result object is created to hold the result of the transformation. Streaming transform for XML (STX) may be used to create stream results.

In step 418, a TransformService.transform method is invoked. The following elements are passed to the method: in Src, styleSheetProfile, parserPluginProfile. A "result" variable of the method contains the result of the transformation.

In step 420, a resultContent object is prepared from the result of the transformation. In one embodiment, step 420 involves inspecting the content to determine if it is XML content, and if so, creating an XML result content value from the result data returned in step 418. Otherwise, the result is in stream content.

As indicated at step 422, if more content is present in the input content list, then control transfers to step 404.

At step 424, if the overwrite flag is true, then in step 426 the contents in the input content list are replaced with the corresponding result content object.

In step 428, the result of the content object list is placed in the flow variable TransformedContents. In step 430, the output Path Success is set and control returns to a calling method. When the process of FIG. 4 returns, other logic in the network element is responsible to forward the output message to the destination identified in the input message. Such a forwarding operation includes selecting an output interface and using a switching system, such as the switching system of a packet data router or a packet data switch, to forward one or more packets containing the output message to a destination. Thus, in one embodiment, the approach herein is implemented in a system that provides both application message payload transformation functions and logic for receiving packets, performing a forwarding or routing decision, and forwarding or routing the packets to destinations.

If an exception occurs, as indicated at step 432, a BladeletException is created and the exception is thrown.

3.3 Transformation Design Example

This section describes parameters that may be used, in one embodiment, with the Transformation Bladelet and Transformation Service.

3.3.1 Transformation Bladelet and Parameters

This section describes input, output and exported parameters for the Transformation Bladelet, according to one embodiment. In an embodiment, input parameters include "Input," "OverwriteContent," "Stylesheet Profile," "ParserPluginProfile," and "Update Message."

The Input Parameter has the type ContentListIterator. This parameter specifies a list of contents to be transformed. Content can be XML or SOAP content, or stream content that may have some non-XML data.

The OverwriteContent parameter is a Boolean value that specifies if the contents in the input list should be replaced with the transformed contents. If true, the input contents are replaced with the transformed result content. If false, a list is created with the resulting transformed contents, and the list is exported in the TransformationResult flow variable.

The StylesheetProfile parameter is a Policy parameter that specifies the name of the transformation profile to use. Each transformation profile comprises information about which XSLT Transform file to use, Vendor name and Transform Package name. Using the attributes defined in a profile, the transformation service selects a transform from a vendor-specific transform package and applies the transform to the input parameter. A profile also can specify a particular XSLT Processor to use.

The ParserPluginProfile is a Policy parameter that specifies a parser plugin profile. It also specifies a default factory for XSLT based transformation. Customer developed parser plugin to parse specific non-xml content can be provided a in transform parser bundle and can be specified in this profile.

The UpdateMessage parameter is a Message that specifies if message content should be replaced by transformed content. The UpdateMessage parameter can take a flow variable value that corresponds to request or response message.

In an embodiment, one output parameter is provided and comprises a TransformedContents parameter of type ContentListIterator. The TransformedContents parameter defines a flow variable that contains the list of transformed contents.

In an embodiment, one exception is defined, and may be named the Transform-Failures exception. If the transformation operations defined herein are successful, an output path of Success is set. However, if an exception occurs, an exception ID is set, and a recoverable Bladelet Exception is thrown. An exception can occur, for example, due to an incorrect transformation or parser profile, bad input data, use of a bad transform, etc.

3.3.2 Transformation Policy Configuration

In one embodiment, a transformation policy file defines a set of properties that specify which XSLT Transform to use from a specific Transform Bundle. Table 2 identifies example attribute names and attribute descriptions that can be used in an implementation.

TABLE 2

| TRANSFORMATION POLICY FILE CONTENTS | |
|---|---|
| Attribute Name | Description |
| StylesheetName | Specifies the name of the transform file to use. The file must be present in the Transform Bundle specified by the parameters below. The transform file indicates what specific fields to transform and what output fields should result from the transformation. |

TABLE 2-continued

TRANSFORMATION POLICY FILE CONTENTS

| Attribute Name | Description |
| --- | --- |
| BundleName | Specifies the name of the transform bundle. |
| Content-Type | This is used to set the content type of the target content when the input content is stream content and its type is not known. |
| UseCompiledTransform | If 'Yes', then it indicates that the specified transform be compiled. |
| TransformerFactory | Specifies XSLT Transformer that will be used in XSLT Based transformation, such as jd-xsltorg.apache.xalan.processor.TransformerFactoryImpl |

3.3.3 Transform Parser Policy Configuration

In an embodiment, a transformation parser policy file defines a set of properties that specify a Content Parser Plugin to use in transformation. Table 3 identifies example attribute names and attribute descriptions that may be used in an embodiment.

TABLE 3

EXAMPLE TRANSFORM PARSER POLICY FILE

| Attribute Name | Description |
| --- | --- |
| ParserClassName | Specifies the name of the content parser plugin class. In one embodiment, this class implements the org.xml.sax.XMLReader interface. Alternately the class can extend the abstract class com.cisco.aons.service.transformTransformXMLReader. The content parser plugin class is used to parse data from input stream content and provide equivalent XML content, which is used as input for XSLT Transformation. |
| BundleName | Specifies the name of the Parser Plugin Bundle. |
| AONSTransformerfactory | This parameter is optional and specifies a factory that implements an XSLT transformer. |

3.3.4 Class Implementation

Table 4 describes interfaces and classes that can be used to implement a transformation service.

TABLE 4

EXAMPLE TRANSFORMATION SERVICE CLASSES

| Class/Interface | Description |
| --- | --- |
| TransformationService | This interface is derived from a Service interface in AONS. It provides methods that perform message transformation. |
| TransformationServiceImpl | This class implements the TransformationService interface. It instantiates and initializes specific transformers. |
| AONSTransformer | This interface defines methods that perform transformation. A specific transformer must provide an implementation of this interface. An example of specific transformer is XSLTTransformer. |
| AONSTransformerFactory | This interface defines a factory interface for a transformer. A specific transformer factory must implement this interface. An example of specific transformer factory is XSLTTransformerFcatory. |
| TransformationBladelet | This class defines a Transformation Bladelet and uses TransformerServiceImpl to perform message transformation. |

Figure 5:
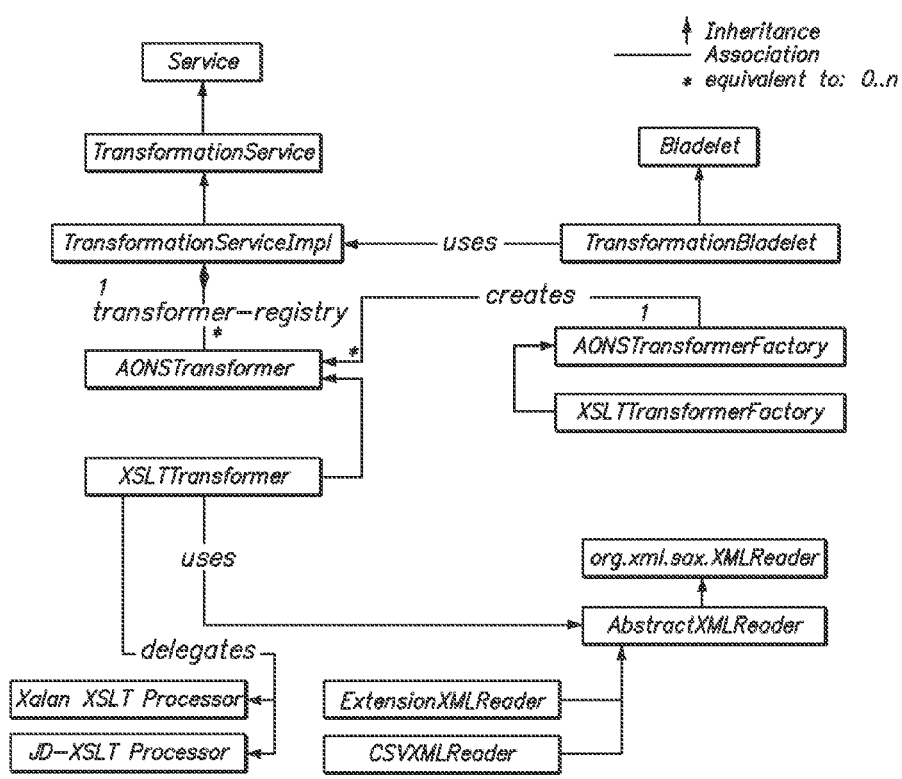
FIG. 5 is a block diagram of a class relationship for an implementation in an object-oriented programming environment.

FIG. 5 is a class diagram that describes high-level programmatic classes that can be used to implement transformation functions in an object-oriented programming environment. The classes of FIG. 5 can be classified based on the functionality they provide. For example, a class implementing the Transformation Bladelet functions described herein is the TransformationBladelet class. The TransformationBladelet class implements the initialization and transformation logic, extracts Bladelet parameters from the Bladelet context and invokes the transformation function using the Transformation Service.

The Transformation Service class of FIG. 5 comprises one or more classes that implement specific Transformer and Transformer Factory classes based on either the XSLT transformation mechanism described herein or an external transformation mechanism. External mechanisms may be used to invoke transformation functions that are provided by third party applications. Examples of such applications include Contivo and Trace Financial.

The Parser Extension class of FIG. 5 enables extensions to an AONS parser. In one embodiment, AONS supports XML and non-XML messages. XML Messages are easily understood and parsed by AONS. However, for non-XML messages an extension is provided that can understand the non-XML messages and provide a corresponding equivalent XML message. The extension implements an XMLReader interface by extending the AbstractXMLReader class. In this approach, the extension emits SAX messages for an equivalent XML message format.

FIG. 7 is a block diagram of a software stack that may be used to implement one embodiment of application message payload transformation in a network infrastructure element. A first lower layer 704 comprises a C-based parsing and XSLT library, and a JAVA-based XML parser such as Xerces from the Apollo open source project. Optionally, a third-party runtime library for a third-party transformer may be included, such as the Contivo runtime library. A second lower layer 706 comprises an XSLT adapter, and a JAVA-based XSLT processor. Optionally, a third-party transformation handler module may be included, such as the Contivo transformation handler.

A transformation server 710 runs logically on the preceding elements of FIG. 7. Transformation server 710 is coupled to a handler registry for registering transformation handler functions in the transformation server.

A transformation bladelet 712 runs logically on the transformation service and performs the functions previously described to generate one or more transformed messages 714. The transformation bladelet 712 also can generate first and second messages 716, 718 or signals indicating whether a message was transformed (message 716) or not transformed (message 718).

One or more transformation functions 720 are coupled to transformation bladelet 712 and determine what specific transformation operations are performed. For example, an XSLT-based transformation function 722 may comprise a mapping of name-value pairs for input messages and output messages. Functions 720 include an enumeration 724 of all installed functions and a result transformation 726 that indicates how to map the source message to a flow variable for output.

3.3.5 Creating and Deploying Transformations

Figure 6B:
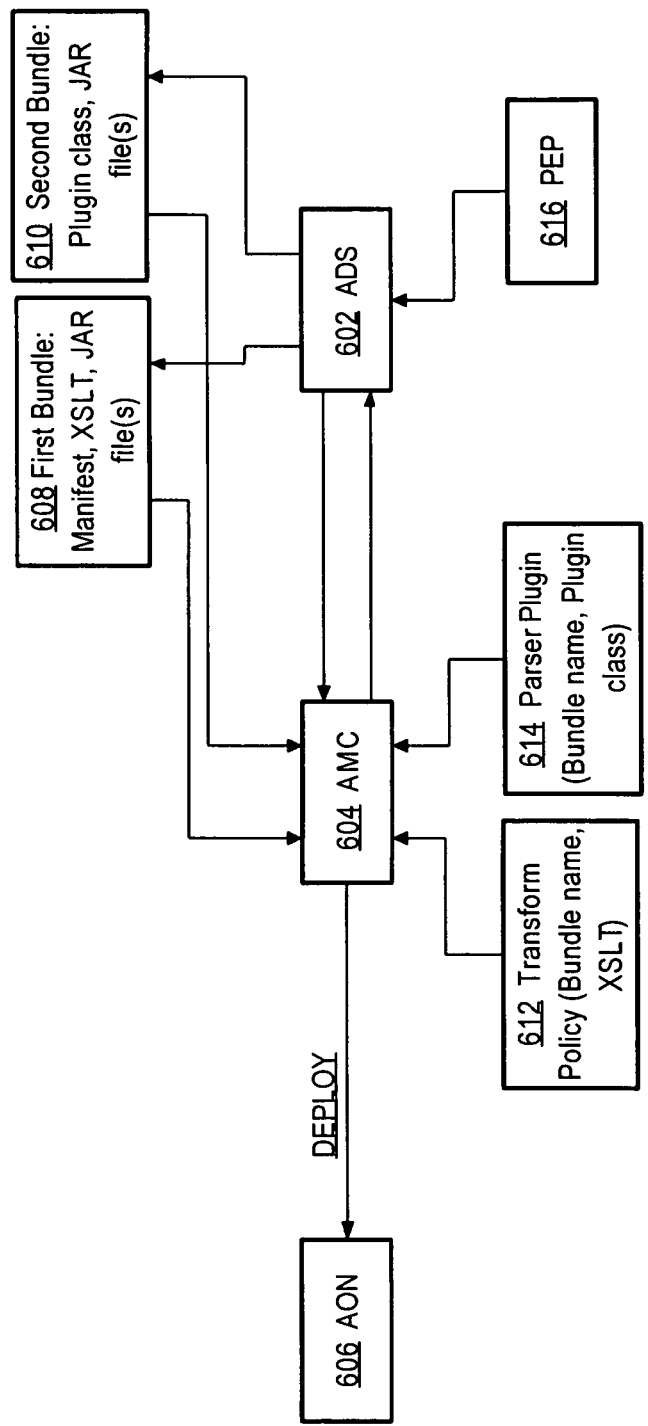
FIG. 6B is a block diagram showing steps involved in one embodiment of creating and deploying transformations in a network infrastructure element.

FIG. 6A is a block diagram showing steps involved in one embodiment of creating and deploying transformations in a network infrastructure element; FIG. 6B is a block diagram showing steps involved in one embodiment of creating and deploying transformations in a network infrastructure element.

Referring first to FIG. 6A, in step 1, a transformation is defined and created in abstract form. Typically a business analyst associated with an enterprise that owns or operates a network ("customer") has responsibility to define required data transformations, based upon the applications that the customer uses. In step 2, the transformation is generated and stored using a third-party data transformation tool. The output of the tool may comprise one or more XSLT style sheets or custom program code. At step 3, such output of the tool is stored in a file system.

At step 4, an administrator logs in to a configuration and provisioning server. At step 5, the administrator initiates an upload function. As shown at step 6, the XSLT style sheets or custom code that was stored at step 3 is uploaded from the file system to the configuration and provisioning server, and packaged appropriately for provisioning or deployment. At step 7, the XSLT style sheets or custom transformation code is provisioned to a network device 110.

In one embodiment, the network device 110 hosts an AONS Design Studio (ADS) application and an AONS blade.

Referring now to FIG. 6B, in another embodiment, a transformation program bundle is created using Cisco's AONS with the following steps. First, a transform bundle and a transform plugin bundle are created. For example, a first bundle 608 comprising a manifest, one or more XSLT transform packages, and one or more JAR files is created using the AONS Design Studio (ADS) 602, commercially available from Cisco Systems, Inc. The user provides the name of the package, version, vendor name, description, properties of the bundle, etc., and then adds one or more XSLT files or packages to create a transform bundle. Similarly, a second bundle 610 is created comprising a parser plugin class and one or more JAR files. Once each bundle is created, the bundle is saved in a file in a location that is specified by the user.

The transform bundle and the transform parser plugin bundle are uploaded and registered in an AONS management application as follows. The user logs on to an AONS Management Console (AMC) 604 that the user uses to manage one or more AONS nodes 606 in the user's network. The user selects the Admin Tab, selects the Transform button, and selects the Upload Transform Package menu item. The user selects the transform bundle file 608 file and clicks UPLOAD. In response, the user interface displays all extensions provided in the package. The user selects Register to register the extensions in AMC 604. The same steps are followed to load the transform parser plugin bundle 610 for registering any transform parser extensions.

Registration causes AMC 604 to create and store a transform policy 612 that references the transform bundle 608 and contains an instantiated class based on the XSLT transform specified in the transform bundle 608. Registration also causes AMC 604 to create and store an XML parser plugin 614 that references the parser plugin bundle 610 and contains an instantiated class for the parser plugin class defined in the bundle.

To deploy the bundles in an AONS node 606, the following steps are utilized. Working with AMC 604, the user selects a Policy Tab, Application Policy, and Global Level menu item. The user selects the bundle that has the packages registered in steps above. The user selects Deploy to deploy the bundle.

In an embodiment, transformation information metadata is provided as part of a transformation bundle. The metadata defines all transformation extensions that are present in a corresponding transformation bundle, which can be either an XSLT transform bundle or a content parser plugin bundle. One or more extensions can be present in a particular bundle. In an XSLT transform bundle, each extension specifies a name that is used to identify the extension and serves as a filename, a display name, and version information. If the bundle is a parser plugin bundle, similar fields specify the class name that implements the XMLReader interface, the display name of the extension, and version information. Table 5 presents an example Transformation Bladelet Info File. Table 6 presents an example XML schema defining the transformation information.

TABLE 5

TRANSFORMATION BLADELET INFO FILE

```
<?xml version="1.0" encoding="UTF-8"?>
<!-- XML file generated by XMLSPY v2004 rel. 4 U (http://www.xmlspy.com)-->
<bladelet-info xmlns:xsi="http://www.w3.org/2001/XMLSchema-instance"
xsi:noNamespaceSchemaLocation=""
  name="transform"
  displayNameKey="transform.bladelet.name"
```

TABLE 5-continued

TRANSFORMATION BLADELET INFO FILE

```
versionId="1"
categoryKey="transformation.category.name"
bundle="TransformBladelet.properties"
bladeletClass="com.cisco.aons.bladelet.v1.TransformationBladelet">
    <icon-ref>
        <palette-icon href="sign16Icon.gif"/>
        <document-icon href="sign32Icon.gif"/>
    </icon-ref>
    <exceptions>
      <exception id="Transform-Failures"
          key="exception.transformfailures.label"
          desc="Transform failures"
          descKey="exception.transformfailures.desc"
          />
    </exceptions>
        <bladelet-design>
          <bladelet-parameters>
              <configuration-group name="Transformation" key="cg.transformation" >
                  <parameter-group name="ContentToTransform"
                        key="cg.transformation.xslt.pg.contenttotransform">
                      <parameter name="Input" type="ContentListIterator"
                          allowVarBinding="true"
                          allowUserInput="false"
key="cg.transformation.xslt.pg.contenttotransform.p.input" />
                      <parameter name="OverwriteContent"
                          type="boolean"
key="cg.transformation.xslt.pg.contenttotransform.p.overwritecontent"
                          optional="true" />
                  </parameter-group>
                  <parameter-group name="ParsingBundle"
                        key="cg.transformation.xslt.pg.parsingbundle">
                      <!-- Assuming that the default parser plugin is in the policy
set; if unspecified use the default builtin -->
                      <parameter name="ParserPluginProfile"
                          type="policy"
domain="com.cisco.aons.transformation.TransformationParserPolicy"
key="cg.transformation.xslt.pg.parsingbundle.p.parserplugin"
                          allowVarBinding="false"
                          allowUserInput="false"
                          optional="true"/>
                  </parameter-group>
                  <parameter-group name="TransformingBundle"
                        key="cg.transformation.xslt.pg.transformingbundle">
                      <parameter name="StylesheetProfile"
                          type="policy"
domain="com.cisco.aons.transformation.TransformationPolicy"
key="cg.transformation.xslt.pg.transformingbundle.p.stylesheetprofile"
                          allowVarBinding="false"
                          allowUserInput="false" />
                  </parameter-group>
              </configuration-group>
          </bladelet-parameters>
        </bladelet-design>
        <bladelet-deployment>
          <system-params/>
        </bladelet-deployment>
        <bladelet-runtime>
          <export-params>
              <!-- These are parameters that the bladelet puts in the context -->
              <parameter name="TransformedContents"
                  key="transformed.contents"
                  type="ContentListIterator"/>
          </export-params>
        </bladelet-runtime>
        <output-paths number="static">
          <output-path label="success" key="success.label"/>
          <output-path label="fail" key="fail.label"/>
        </output-paths>
</bladelet-info>
```

TABLE 6

TRANSFORMATION BLADELET INFO FILE

```
<?xml version = "1.0" encoding = "UTF-8"?>
<!--Generated by Turbo XML 2.4.1.100. Conforms to w3c
http://www.w3.org/2001/XMLSchema-->
<xsd:schema xmlns:xsd = "http://www.w3.org/2001/XMLSchema"
        elementFormDefault = "qualified">
    <xsd:element name = "TransformExtensionInfo">
        <xsd:complexType>
            <xsd:sequence>
                <xsd:choice>
                    <xsd:element ref = "TransformInfo"/>
                    <xsd:element ref = "ParserPluginInfo"/>
                </xsd:choice>
                <xsd:element ref = "AONSVersion"/>
            </xsd:sequence>
        </xsd:complexType>
    </xsd:element>
    <xsd:element name = "TransformInfo">
        <xsd:complexType>
            <xsd:sequence>
                <xsd:element ref = "XSLTTransformName" maxOccurs = "unbounded"/>
            </xsd:sequence>
        </xsd:complexType>
    </xsd:element>
    <xsd:element name = "ParserPluginInfo">
        <xsd:complexType>
            <xsd:sequence>
                <xsd:element ref = "ParserClassName" maxOccurs = "unbounded"/>
            </xsd:sequence>
        </xsd:complexType>
    </xsd:element>
    <xsd:element name = "AONSVersion">
        <xsd:complexType>
            <xsd:attribute name = "version" use = "required">
                <xsd:simpleType>
                    <xsd:restriction base = "xsd:string">
                        <xsd:minLength value = "1"/>
                    </xsd:restriction>
                </xsd:simpleType>
            </xsd:attribute>
        </xsd:complexType>
    </xsd:element>
    <xsd:element name = "XSLTTransformName">
        <xsd:complexType>
            <xsd:attribute name = "name" use = "required">
                <xsd:simpleType>
                    <xsd:restriction base = "xsd:string">
                        <xsd:minLength value = "1"/>
                    </xsd:restriction>
                </xsd:simpleType>
            </xsd:attribute>
            <xsd:attribute name = "display-name" use = "required">
                <xsd:simpleType>
                    <xsd:restriction base = "xsd:string">
                        <xsd:minLength value = "1"/>
                    </xsd:restriction>
                </xsd:simpleType>
            </xsd:attribute>
            <xsd:attribute name = "version" use = "required">
                <xsd:simpleType>
                    <xsd:restriction base = "xsd:string">
                        <xsd:minLength value = "1"/>
                    </xsd:restriction>
                </xsd:simpleType>
            </xsd:attribute>
        </xsd:complexType>
```

TABLE 6-continued

TRANSFORMATION BLADELET INFO FILE

```
    </xsd:element>
    <xsd:element name = "ParserClassName">
        <xsd:complexType>
            <xsd:attribute name = "class-name" use = "required">
                <xsd:simpleType>
                    <xsd:restriction base = "xsd:string">
                        <xsd:minLength value = "1"/>
                    </xsd:restriction>
                </xsd:simpleType>
            </xsd:attribute>
            <xsd:attribute name = "display-name" use = "required">
                <xsd:simpleType>
                    <xsd:restriction base = "xsd:string">
                        <xsd:minLength value = "1"/>
                    </xsd:restriction>
                </xsd:simpleType>
            </xsd:attribute>
            <xsd:attribute name = "version" use = "required">
                <xsd:simpleType>
                    <xsd:restriction base = "xsd:string">
                        <xsd:minLength value = "1"/>
                    </xsd:restriction>
                </xsd:simpleType>
            </xsd:attribute>
        </xsd:complexType>
    </xsd:element>
</xsd:schema>
```

TABLE 7

TRANSFORMATION INFO SAMPLE FILE FOR PARSER PLUGIN EXTENSION

```
<?xml version = "1.0" encoding = "UTF-8"?>
<TransformExtensionInfo xmlns:xsi =
"http://www.w3.org/2001/XMLSchema-instance"
xsi:noNamespaceSchemaLocation = "transform-info.xsd">
    <ParserPluginInfo>
        <ParserClassName class-name =
"sample.csvplugin.CSVReader" display-name =
"CSV Parser" version = "1"/>
    </ParserPluginInfo>
    <AONSVersion version = "1"/>
</TransformExtensionInfo>
```

TABLE 8

TRANSFORMATION INFO SAMPLE FILE FOR XSLT TRANSFORM EXTENSION

```
<?xml version = "1.0" encoding = "UTF-8"?>
<TransformExtensionInfo xmlns:xsi =
"http://www.w3.org/2001/XMLSchema-instance"
xsi:noNamespaceSchemaLocation =
"file:///D:/temp/transformationBundle/TransformExtensionInfo.xsd">
    <TransformInfo>
        <XSLTTransformName name = "identity.xslt" display-name =
"Identity Transform" version = "1"/>
    </TransformInfo>
    <AONSVersion version = "1"/>
</TransformExtensionInfo>
```

TABLE 9

SAMPLE TEST TRANSFORMATION FLOW

```
<flow
    description="This is a Transformation Flow"
    interactionStyle="Request-Response"
    logging="none"
```

TABLE 9-continued

SAMPLE TEST TRANSFORMATION FLOW

```
    name="TransformationFlow"
    sla="0">
        <flow-vars>
        <flow-var type="SearchResultListIterator" name="ME-Result"/>
        <flow-var type="Content" name="ME-Content"/>
        <flow-var type="ContentListIterator" name="Input"/>
        <flow-var type="ContentListIterator" name="TransformationResult"/>
        <flow-var type="Message" name="REQUEST_MESSAGE"/>
        <flow-var type="Message" name="RESPONSE_MESSAGE"/>
    </flow-vars>
    <flow-steps>
        <request-action id="100" >
            <first-bladelet id="1000"/>
            <bladelet
                    name="ForwardRequest:1"
                    id="1000"
                    description="IO bladelet">
                    <param-values name="PARAM-ABC">
                        <value>"This is a test"</value>
                    </param-values>
                    <next-steps>
                        <response-link id="111"/>
                        <!-- <on-exception id="3"/>-->
                    </next-steps>
            </bladelet>
        </request-action>
        <response-action id="111">
            <first-bladelet id="5000"/>
            <bladelet name="TranformationBladelet:1"
                    description="Bladelet Description"
                    id="5000">
                <param-values name="Input"
                    type="ContentListIterator">
                    <value>$RESPONSE_MESSAGE.content( ).iterator( )</value>
                    <!-- <value>$ME-Result.elementAt(0).elementAt("Label")</value> -->
                </param-values>
                <param-values name="UpdateMessage"
                    type="Message">
                    <value>$RESPONSE_MESSAGE</value>
                    <!-- <value>$ME-Result.elementAt(0).elementAt("Label")</value> -->
                </param-values>
                <param-values name="StylesheetProfile" type="string">
                    <value>IdentityTransform</value>
                </param-values>
                <param-values name="ParserPluginProfile" type="string">
                    <value>CiscoXSLTTransformation</value>
                </param-values>
                <exported-value name="TransformationResult" type="ContentListIterator"
bindId="TransformationResult"/>
                <next-steps>
                    <next-step label="Success" id="7000"/>
                    <next-step label="Fail" id="7000"/>
                </next-steps>
            </bladelet>
            <bladelet
                name="ForwardRequest:1"
                    id="7000"
                    description="IO bladelet">
                    <param-values name="PARAM-ABC">
                        <value>"This is a test"</value>
                    </param-values>
                    <next-steps>
                        <!--<response-link id="2222"/>-->
                        <!--<on-exception id="3"/>-->
                    </next-steps>
            </bladelet>
        </response-action>
    </flow-steps>
    <compenstation-steps>
        <first-bladelet id="1000"/>
        <bladelet name="bladelet_5:1" id="1000" description="compenstaion step bladelet">
            <param-values name="PARAM-ABC">
                <value>"This is a compensation steps."</value>
            </param-values>
        </bladelet>
    </compenstation-steps>
</flow>
```

TABLE 10

SAMPLE TRANSFORMATION PARSER POLICY

```xml
<?xml version="1.0" encoding="UTF-8"?>
<AttributeDomain domainName="TransformationParserPolicy">
  <AttributeDefinition attributeName="AONSTransformerFactory"/>
  <AttributeDefinition attributeName="ParserClassName"/>
  <AttributeDefinition attributeName="VendorName"/>
  <AttributeDefinition attributeName="BundleName"/>
  <AttributeDefinition attributeName="PluginJarFileName"/>
  <PropertySet key="CiscoXSLTTransformation">
      <Attribute name="AONSTransformerFactory">
      <!-- This is the default, and need not be specified. This is something we will open up to allow
            Java Plugins to handle third party transformers -->
          <Value value="com.cisco.aons.com.cisco.aons.service.transform.XSLTTransformerFactory"/>
      </Attribute>
      <Attribute name="ParserClassName">
      <!-- sample CSV Parser. This is optional too. -->
         <!-- <Value value="com.cisco.aons.service.transform.CSVReader"/> -->
          <Value value="sample.csvplugin.CSVReader"/>
      </Attribute>
      <Attribute name="VendorName">
         <Value value="acmeInc"/>
      </Attribute>
      <Attribute name="BundleName">
         <Value value="testbundle"/>
      </Attribute>
      <Attribute name="PluginJarFileName">
         <Value value="sample.jar"/>
      </Attribute>
  </PropertySet>
</AttributeDomain>
```

TABLE 11

SAMPLE TRANSFORM POLICY

```xml
<?xml version="1.0" encoding="UTF-8"?>
<AttributeDomain domainName="Transformation">
  <AttributeDefinition attributeName="UseCompiledTransform"/>
  <AttributeDefinition attributeName="translet-name"/>
  <AttributeDefinition attributeName="destination-directory"/>
  <AttributeDefinition attributeName="package-name"/>
  <AttributeDefinition attributeName="jar-name"/>
  <AttributeDefinition attributeName="generate-translet"/>
  <AttributeDefinition attributeName="auto-translet"/>
  <AttributeDefinition attributeName="ParserClassName"/>
  <AttributeDefinition attributeName="StylesheetName"/>
  <AttributeDefinition attributeName="TargetContentType"/>
  <AttributeDefinition attributeName="TransformerFactory"/>
  <AttributeDefinition attributeName="VendorName"/>
  <AttributeDefinition attributeName="BundleName"/>
  <PropertySet key="IdentityTransform">
      <Attribute name="StylesheetName">
         <Value value="Identity.xsl"/>
      </Attribute>
      <Attribute name="TargetContentType">
         <Value value="text/xml"/>
      </Attribute>
      <Attribute name="TransformerFactory">
         <Value value="org.apache.xalan.processor.TransformerFactoryImpl"/>
      </Attribute>
      <Attribute name="VendorName">
         <Value value="acmeInc"/>
      </Attribute>
      <Attribute name="BundleName">
         <Value value="testbundle"/>
      </Attribute>
  </PropertySet>
</AttributeDomain>
```

4.0 Implementation Mechanisms—Hardware Overview

Figure 8:
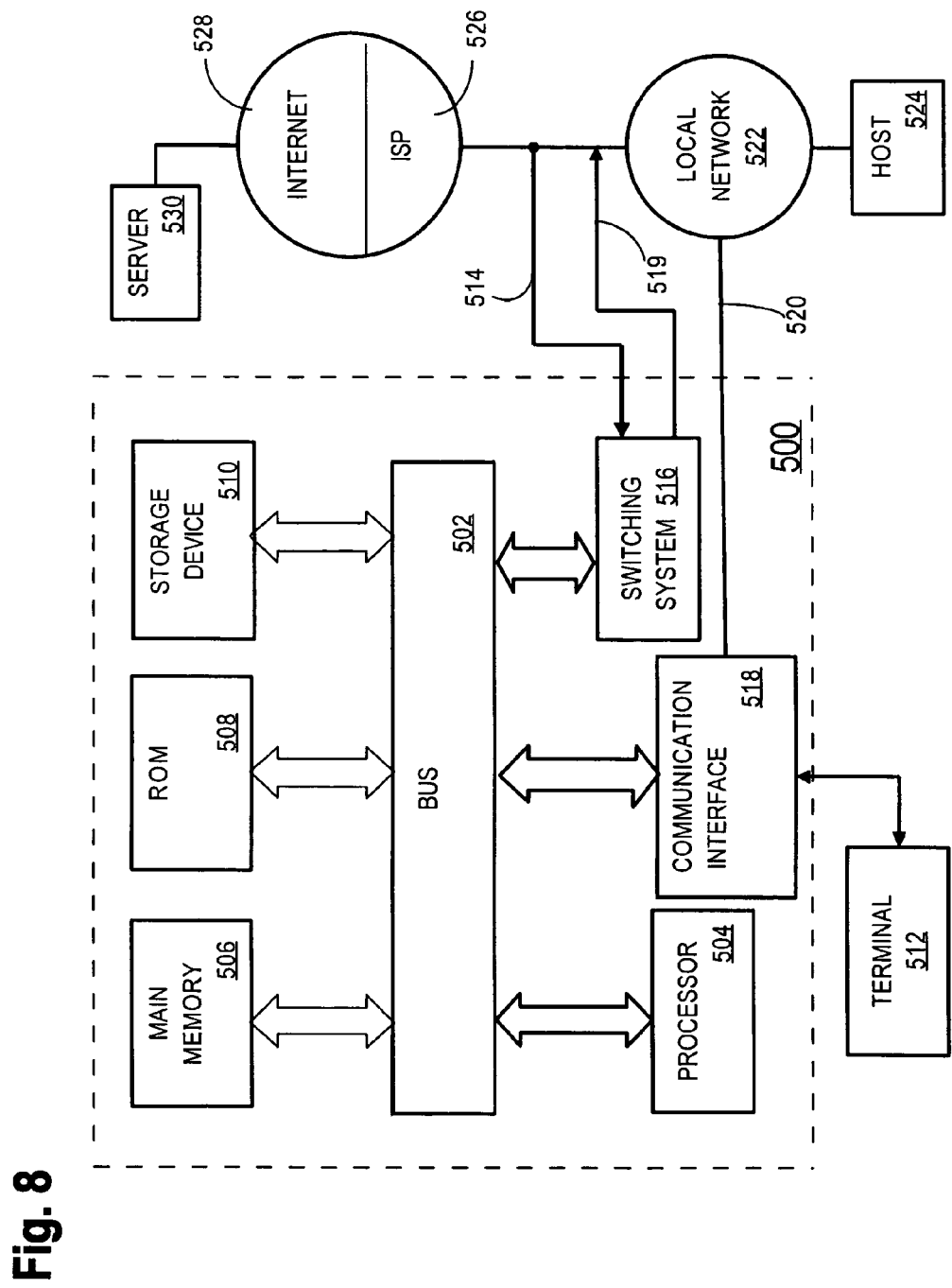
FIG. 8 is a block diagram that illustrates a computer system upon which an embodiment may be implemented.

FIG. 8 is a block diagram that illustrates a computer system 800 upon which an embodiment of the invention may be implemented. The preferred embodiment is implemented using one or more computer programs running on a network element such as a router device. Thus, in this embodiment, the computer system 800 is a router.

Computer system 800 includes a bus 802 or other communication mechanism for communicating information, and a processor 804 coupled with bus 802 for processing information. Computer system 800 also includes a main memory 806, such as a random access memory (RAM), flash memory, or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk, flash memory or optical disk, is provided and coupled to bus 802 for storing information and instructions.

A communication interface 818 may be coupled to bus 802 for communicating information and command selections to processor 804. Interface 818 is a conventional serial interface such as an RS-232 or RS-422 interface. An external terminal 812 or other computer system connects to the computer system 800 and provides commands to it using the interface 814. Firmware or software running in the computer system 800 provides a terminal interface or character-based command interface so that external commands can be given to the computer system.

A switching system 816 is coupled to bus 802 and has an input interface 814 and an output interface 819 to one or more external network elements. The external network elements may include a local network 822 coupled to one or more hosts 824, or a global network such as Internet 828 having one or more servers 830. The switching system 816 switches information traffic arriving on input interface 814 to output interface 819 according to pre-determined protocols and conventions that are well known. For example, switching system 816, in cooperation with processor 804, can determine a destination of a packet of data arriving on input interface 814 and send it to the correct destination using output interface 819. The destinations may include host 824, server 830, other end stations, or other routing and switching devices in local network 822 or Internet 828.

The invention is related to the use of computer system 800 for application message payload transformation in a network infrastructure element. According to one embodiment of the invention, application message payload transformation in a network infrastructure element is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Communication interface 818 also provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for application message payload transformation in a network infrastructure element as described herein.

The received code may be executed by processor 804 as it is received, and/or stored in storage device 810, or other non-volatile storage for later execution. In this manner, computer system 800 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The preceding description has disclosed an approach for performing application message payload transformation in a network device. The application message payload transformation is performed based on policies that are defined declaratively in terms of application endpoints and application message content. The approach herein provides an improved application message payload transformation approach because a network device is more efficient in performing such transformations, which occur outside the application and the host of the application.

The approach herein has numerous benefits over prior approaches. For example, the approach reduces the number of processing locations at which a message is transformed. Application endpoints are not required to perform message payload transformation. As a result, application resources can focus on core application functions, rather than transforming the messages that the application needs to consume based on all other sending applications that are producing such messages.

Further, separating the management of message transformation policies from the actual message transformation enables a user or system to define such policies declaratively in a single place, and apply them on all the network devices where the transformation is done.

The approach herein is useful for any network gear vendor that needs mechanisms to provide message transformation capability in a networking device to enable easier application integration.

What is claimed is:

1. A data processing apparatus, comprising:
a plurality of network interfaces that are configured to be coupled to a data network for receiving one or more packets therefrom and sending one or more packets thereto;
one or more hardware processors;
a switching system coupled to the one or more hardware processors and packet forwarding logic, wherein the switching system and packet forwarding logic are configured to receive packets on a first network interface, determine a second network interface on which to send the packets, and to send the packets on the second network interface;
application message transformation logic comprising one or more stored sequences of instructions which, when executed by the one or more hardware processors, cause:
receiving one or more packets representing an input application message from a sender application to a receiver application;
extracting an application message payload from the input application message;
identifying one or more first content elements in the application message payload, wherein the one or more first content elements comprise a first field and a second field; wherein the first field is before the second field in the one or more first content elements;
transforming the one or more first content elements into one or more second content elements of an output application message at least in part by:
reordering at least the first field and the second field to an order that is expected by the receiver application, wherein the first field is after the second field in the one or more second content elements; and
performing a transformation based on code page translation, wherein the code page translation includes mapping the one or more first content elements to a locale-specific content encoding, wherein the locale-specific content encoding includes elements representing times, dates, or calendar entries;
forwarding the output application message to a destination that is identified in the input application message.

2. The apparatus of claim 1, wherein the input application message is logically associated with Open Systems Interconnection (OSI) network model Layer 5 or above.

3. The apparatus of claim 1, wherein the apparatus comprises any of a packet data router or a packet data switch configured to couple to a packet-switched network.

4. The apparatus of claim 1, wherein the application message transformation logic comprises one or more extensible stylesheet language transforms, one or more parser plugin transforms, and one or more custom transforms that are logically coupled and perform successive transformation operations on the application message payload.

5. The apparatus of claim 1, wherein the application message transformation logic comprises sequences of instructions which, when executed, cause transforming the one or more first content elements into the one or more second content elements comprises changing a data value from the one or more first content elements.

6. The apparatus of claim 1, wherein the application message transformation logic comprises sequences of instructions which, when executed, cause applying an extensible stylesheet language transformation file to the input application message to generate the output application message.

7. The apparatus of claim 1, wherein a first data value corresponds to the first field and a second data value corresponds to the second field, wherein the first data value is before the second data value in the one or more first content elements, and the application message transformation logic comprises sequences of instructions which, when executed, cause reordering the first data value and the second data value, and wherein the first data value is after the second data value in the one or more second content elements.

8. The data processing apparatus of claim 1, wherein the first field has a first same name in both the one or more first content elements and the one or more second content elements; and wherein the second field has a second same name in both the one or more first content elements and the one or more second content elements.

9. The apparatus of claim 1, wherein the application message transformation logic comprises sequences of instructions which, when executed, cause transforming the one or more first content elements into the one or more second content elements further comprises performing a transformation based on content validation, or data validation.

10. The apparatus of claim 1, wherein the application message transformation logic comprises sequences of instructions which, when executed, cause:
performing the transformation based on one or more of required media types of the receiver application, security credential mapping, content aggregation, content splitting, service interface virtualization, or performing content-based lookup, extraction, routing and distribution.

11. A machine-implemented method comprising:
receiving one or more packets representing an input application message from a sender application to a receiver application;
wherein the one or more packets are received in a network infrastructure data processing element comprising a plurality of network interfaces that are configured to be coupled to a data network for receiving one or more packets therefrom and sending one or more packets thereto, one or more processors, a switching system coupled to the one or more processors and packet forwarding logic, wherein the switching system and packet forwarding logic are configured to receive packets on a first network interface, determine a second network interface on which to send the packets, and to send the packets on the second network interface, and application message transformation logic;
extracting an application message payload from the input application message;
identifying one or more first content elements in the application message payload, wherein the one or more first content elements comprise a first field and a second field, wherein the first field is before the second field in the one or more first content elements;
transforming the one or more first content elements into one or more second content elements of an output application message at least in part by:
reordering at least the first field and the second field to an order that is expected by the receiver application, wherein the first field is after the second field in the one or more second content elements; and performing a transformation based on code page translation, wherein the code page translation includes mapping the one or more first content elements to a locale-specific content encoding, wherein the locale-specific content encoding includes elements representing times, dates, or calendar entries;

forwarding the output application message to a destination that is identified in the input application message;

wherein the method is performed by one or more processors.

12. The method of claim 11, wherein the input application message is logically associated with Open Systems Interconnection (OSI) network model Layer 5 or above.

13. The method of claim 11, wherein transforming the one or more first content items into the one or more second content items comprises applying an extensible stylesheet language transformation file to the input application message to generate the output application message.

14. The method of claim 11, wherein transforming the one or more first content elements into the one or more second content elements further comprises removing a field and a corresponding data value from the one or more first content elements.

15. The method of claim 11, wherein a first data value corresponds to the first field and a second data value corresponds to the second field, wherein the first data value is before the second data value in the one or more first content elements, and wherein reordering at least the first field and the second field comprises reordering the first data value and the second data value, and wherein the first data value is after the second data value in the one or more second content elements.

16. The method of claim 11, wherein the first field has a first same name in both the one or more first content elements and the one or more second content elements; and wherein the second field has a second same name in both the one or more first content elements and the one or more second content elements.

17. The method of claim 11, wherein transforming the one or more first content elements into the one or more second content elements further comprises performing a transformation based on content validation, or data validation.

18. The method of claim 11, wherein transforming the one or more first content elements into the one or more second content elements further comprises:

performing the transformation based on one or more of required media types of the receiver application, security credential mapping, content aggregation, content splitting, service interface virtualization, or performing content-based lookup, extraction, routing and distribution.

19. A non-transitory computer-readable storage medium storing one or more sequences of instructions, which instructions, when executed by one or more processors, cause the one or more processors to perform:

receiving one or more packets representing an input application message from a sender application to a receiver application;

wherein the one or more packets are received in a network infrastructure data processing element comprising a plurality of network interfaces that are configured to be coupled to a data network for receiving one or more packets therefrom and sending one or more packets thereto, one or more processors, a switching system coupled to the one or more processors and packet forwarding logic, wherein the switching system and packet forwarding logic are configured to receive packets on a first network interface, determine a second network interface on which to send the packets, and to send the packets on the second network interface, and application message transformation logic;

extracting an application message payload from the input application message;

identifying one or more first content elements in the application message payload;

wherein the one or more first content elements comprise a first field and a second field;

wherein the first field is before the second field in the one or more first content elements;

transforming the one or more first content elements into one or more second content elements of an output application message at least in part by:

reordering at least the first field and the second field to an order that is expected by the receiver application, wherein the first field is after the second field in the one or more second content elements; and performing a transformation based on code page translation, wherein the code page translation includes mapping the one or more first content elements to a locale-specific content encoding, wherein the locale-specific content encoding includes elements representing times, dates, or calendar entries;

forwarding the output application message to a destination that is identified in the input application message.

20. The non-transitory computer-readable storage medium of claim 19, wherein the input application message is logically associated with Open Systems Interconnection (OSI) network model Layer 5 or above.

21. The non-transitory computer-readable storage medium of claim 19, further comprising sequences of instructions which when executed cause applying an extensible stylesheet language transformation file to the input application message to generate the output application message.

22. The non-transitory computer-readable storage medium of claim 19, further comprising sequences of instructions which when executed cause removing a field and a corresponding data value from the one or more first content elements.

23. The non-transitory computer-readable storage medium of claim 19, wherein a first data value corresponds to the first field and a second data value corresponds to the second field, wherein the first data value is before the second data value in the one or more first content elements, and wherein further comprising sequences of instructions which when executed cause reordering the first data value and the second data value, and wherein the first data value is after the second data value in the one or more second content elements.

24. The non-transitory computer-readable storage medium of claim 19, wherein the first field has a first same name in both the one or more first content elements and the one or more second content elements; and wherein the second field has a second same name in both the one or more first content elements and the one or more second content elements.

25. The non-transitory computer-readable storage medium of claim 19, further comprising sequences of instructions which when executed cause performing a transformation based on content validation, or data validation.

26. The non-transitory computer-readable storage medium of claim 19, further comprises sequences of instructions which, when executed, cause:

performing the transformation based on one or more of required media types of the receiver application, security credential mapping, content aggregation, content splitting, service interface virtualization, or performing content-based lookup, extraction, routing and distribution.

* * * * *